Oct. 23, 1928.
C. E. PRYOR
1,688,432
BUMPER
Filed June 24, 1925
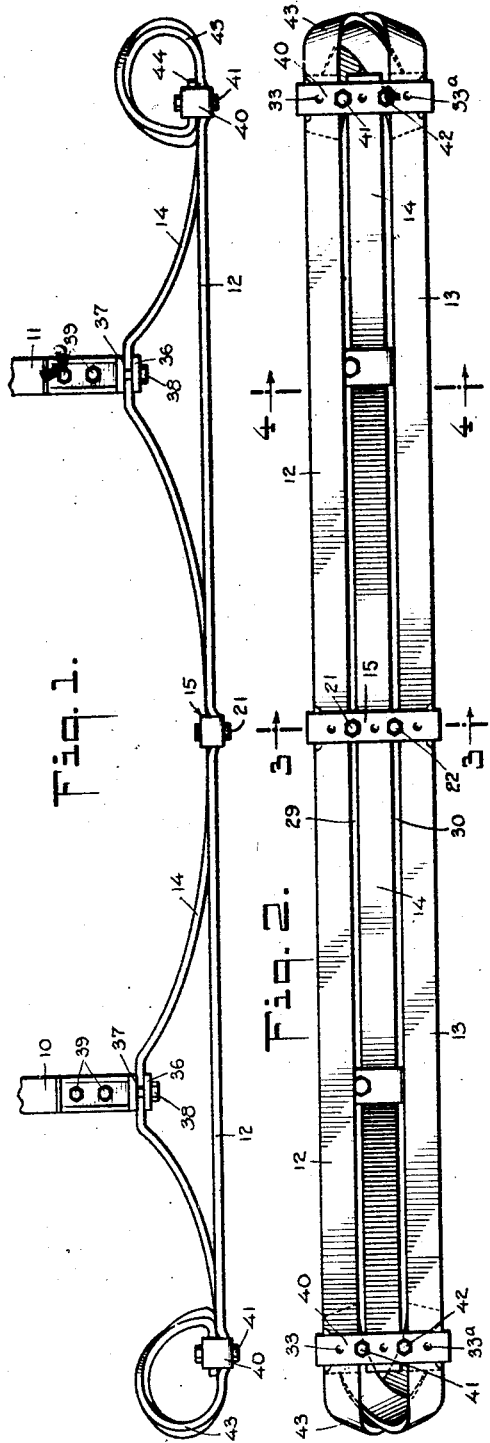
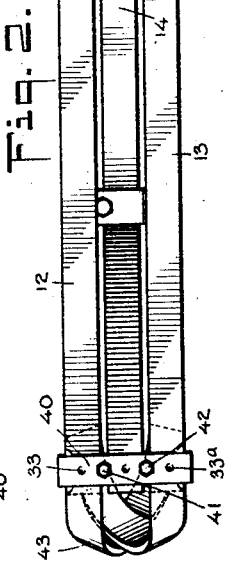
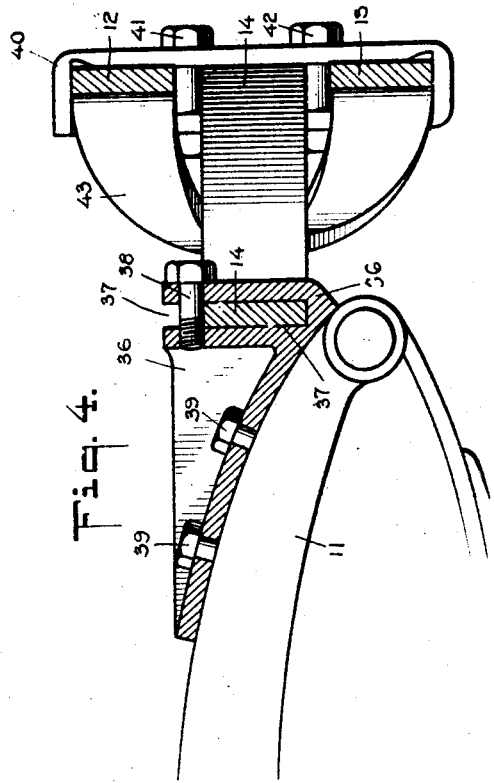
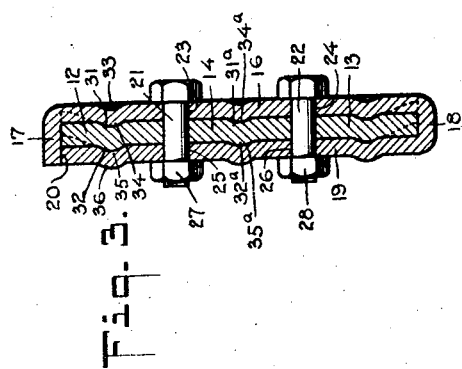
INVENTOR,
Clarence E. Pryor,
BY Henry J. Lucke,
ATTORNEY.

Patented Oct. 23, 1928.

1,688,432

UNITED STATES PATENT OFFICE.

CLARENCE E. PRYOR, OF ELIZABETH, NEW JERSEY.

BUMPER.

Application filed June 24, 1925. Serial No. 39,223.

This invention relates to bumpers.

An object of the invention is to provide a bumper, particularly for automobiles, comprising a plurality of bumper bars assembled to afford enhanced rigidity as compared with the rigidity of the individual bumper bars, and arranged to preclude noise by vibration.

A further object of the invention is to provide an assembly of plurality of bumper bars which may be formed of readily made and relatively light weight parts and tied to one another in a simple and effective manner.

Pursuant to the more preferred forms of my invention, the bumper comprises three bumper bars, arranged in spaced relation one above the other, the uppermost and lower bars being in substantially vertical alignment and secured to one another by means of a central connecting member and a pair of outward connecting members, the third or innermost bar extending from and at opposing sides of the central connecting member toward the spring horns or equivalent of the automobile for attachment thereto and thereby supporting the bumper as a whole, the opposite end portions of the third or central bumper bar being secured to the pair of outward connecting members. The outward ends of the uppermost and lowermost bumper bars at each side of the bumper are curvedly bent rearwardly and respectively toward one another and locked in position by the pair of outward connecting members or otherwise rigidly anchored.

Further features and objects of the invention will be more fully understood from the following detail description and the accompanying drawings, in which Fig. 1 is a top plan view of an embodiment of my bumper, shown attached to the spring horns of an automobile for support thereof;

Fig. 2 is a front elevation of my bumper shown in Fig. 1;

Fig. 3 is a sectional elevation on line 3—3 of Fig. 2, on a greatly enlarged scale; and Fig. 4 is a sectional elevation on line 4—4 of Fig. 2, on substantially the same scale as Fig. 3.

Referring to the drawings, the spring horns of any approved form of an automobile or like vehicle are indicated at 10, 11. It will be understood that any other approved form of support for my bumper may be employed.

In the form of my invention as illustrated in the drawings, my bumper comprises the uppermost bumper bar 12, the lowermost bumper bar 13 and the central bumper bar 14, assembled and mounted as more particularly described hereinafter. Such bumper bars, 12, 13, 14, are preferably formed of a high grade of steel, such as manganese steel or of other forms of steel or equivalent material as may be preferred.

Substantially at the center of my bumper, I arrange the central connecting member 15, see Figs. 2 and 3, preferably in the form of a clip comprising the vertically extending front body portion 16, the upper end flange portion 17, the lower flange portion 18 and the rear body portion 19, the end 20 of which last-named portion 19 may terminate in close proximity to the upper end flange portion 17. The connecting member or clip 15 is secured to the bumper bars 12, 13, 14 by means of the bolts 21, 22 passing through suitable openings 23, 24 respectively in the front body portion 16 and similarly respectively through the openings 25, 26 in the rear body portion 19. The bolts 21, 22 are tightened by means of their respective nuts 27, 28. Such bolts 21, 22 may be round or square or of other contour of cross-section as may be desired, and preferably of a cross-section substantially equal to the clearance 29 between the uppermost bumper bar 12 and the central bumper bar 14 and the clearance 30 between the central bumper bar 14 and the lowermost bumper bar 13.

For the purpose of attaining increased rigidity of connection between the clip 15 and the respective bumper bars 12, 13, 14, each bumper bar, see Fig. 3, as the uppermost bumper bar 12, is subjected to impact to indent a substantially circular depression 31 on the front face of the bumper bar 12 and a substantially corresponding convex protuberance 32 on the rear face theerof. The body portion 16 of the clip 15 is correspondingly depressed circularly on its outer face as indicated at 33, and correspondingly projected on its inner face as indicated at 34, which protuberance 34 is in substantial register with the concave indent 31 of the bumper 12. Similarly, the rear body portion 19 of the clip 15 is depressed concavely at 35 on its front face in substantial register with the rear convex protuberance 32 of the bumper bar 12 and also giving rise to the rear convex protuberance 36 on the rear body portion 19 of the clip 15.

In a similar manner, the central bumper bar 14 and the lowermost bumper bar 13 are respectively provided with a substantially circular indent indicated at 31ᵃ on the front face and a similar protuberance 32ᵃ on the rear face, respectively in substantial register with the convex protuberance 34ᵃ on the inner face of the body portion 16 of the clip 15 and the substantially circular concave depression 35ᵃ of the rear body portion 19 of the clip 15.

The central bumper bar 14 extends on the opposing sides of the central clip 15 toward the spring horns 10, 11 of the automobile, or equivalent support, to be respectively secured thereto by means of a bracket 36, see Fig. 4, which preferably comprises the upwardly open slot member 37 for snugly receiving the central bumper bar 14. The bolt 38 passes through suitable openings in the front and rear parts of the slot member 37; such bolt preferably engages the upper edge of the central bumper bar 14, to additionally retain the bumper bar 14 within the slot and to prevent vibration. The body of each bracket 36 is secured to its support such as the spring horn 11, see Fig. 4, by means of the bolts 39 or rivets or the like.

Adjacent the outer ends of the bumper bars 12, 13, 14, I provide outward clips for anchoring the ends of the bumper bars and to effect mutual stiffening relation between the bumper bars and the respective outward clips. Referring to Fig. 2, the left-hand outward clip 40, see also Fig. 4, corresponds to the central clip 15, and preferably having indents at 33, and protuberances corresponding to the aforesaid protuberances 34, 34ᵃ and similar indentations and protuberances are provided on the front and rear faces of the bumper bars 12, 13, 14, corresponding to the aforesaid central indentations and protuberances.

The bolts 41, 42 of the left-hand outward clip 40 correspond to the bolts 21, 22 of the central clip 15.

To attain the enhanced rigidity combined with superior resiliency at the outward ends of the bumper bars, I provide a rearward bend 43 of the uppermost bumper bar 12 and preferably downwardly toward the lowermost bar 13. The rearward bend 43 is suitably anchored to the bumper structure, as by locating its extreme end 44, see Fig. 1, under the clip 40, which is formed with a wider slot as compared with the central clip 15. In a similar manner, the end of the lowermost bumper 13 is bent rearwardly and preferably upwardly and anchored at its extreme end by the clip 40 in contact with the uppermost bar 12.

In a like manner, the left-hand clip 40, see Figs. 1 and 2, serves to secure the rear ends of the bumper bars and to attain rigidity and resiliency of the curved ends of the uppermost and lowermost bumper bars, and like reference numbers designate like parts.

In lieu of anchoring the ends of the bumper bars 12, 13 within the respective outward clips 40, 40, the extreme ends of the bumper bars 12, 13 may be respectively secured by rivets either to an intermediate body portion of the bumper bars 12, 13 as by bending each curved end substantially horizontally i. e., on itself, or by riveting to the intermediate body portion of the other bumper bar 13 and 12, respectively, namely by bending the opposite outward ends of the uppermost bumper bar 12 downwardly and the opposite outward ends of the lowermost bar 13 upwardly.

Whereas I have described my invention by reference to specific forms thereof, it will be understood that many changes and modifications may be made without departing from the spirit of the invention.

I claim:

1. A bumper comprising a plurality of substantially vertically aligned bumper bars, the ends of said bumper bars being rearwardly bent and means for securing the bent ends respectively of the lowermost bar to a body portion of the uppermost bar and the bent ends of the uppermost bar to a body portion of the lowermost bar.

2. A bumper comprising a pair of substantially vertically aligned bumper bars, the opposite ends of said bumper bars being respectively rearwardly bent, means for securing the bent ends respectively of said lowermost bar to a body portion of said uppermost bar, and means for securing the bent ends respectively of said uppermost bar to a body portion of said lowermost bar.

3. A bumper comprising a pair of substantially vertically aligned bumper bars, the opposite ends of said bumper bars being respectively rearwardly bent, common means for securing the bent end at one end of said lowermost bar to a body portion of said uppermost bar and for securing the bent end at said one end of said uppermost bar to a body portion of said lowermost bar, and common means for securing the bent end at the opposite end of said lowermost bar to a body portion of said uppermost bar and for securing the bent end at said opposite end of said uppermost bar to a body portion of said lowermost bar.

4. A bumper comprising a pair of substantially vertically aligned bumper bars, the opposite ends of said bumper bars being respectively rearwardly bent, means for securing the bent ends respectively of said lowermost bar to a body portion of said uppermost bar, means for securing the bent ends respectively of said uppermost bar to a body portion of said lowermost bar, a third bar disposed between said pair of bumper bars, and bracket means for securing said third bar to said uppermost bar and said lowermost bar and thereby position and support said bumper as a whole.

5. A bumper comprising a pair of substantially vertically aligned bumper bars, the opposite ends of said bumper bars being respectively rearwardly bent, common means for securing the bent end at one end of said lowermost bar to a body portion of said uppermost bar and for securing the bent end at said one end of said uppermost bar to a body portion of said lowermost bar, common means for securing the bent end at the opposite end of said lowermost bar to a body portion of said uppermost bar and for securing the bent end at said opposite end of said uppermost bar to a body portion of said lowermost bar, a third bar disposed between and connected to said pair of bumper bars, and bracket means for securing said third bar to said uppermost bar and said lowermost bar and thereby position and support said bumper as a whole.

In testimony whereof I have signed this specification this 2nd day of December, 1924.

CLARENCE E. PRYOR.